Figure 1:
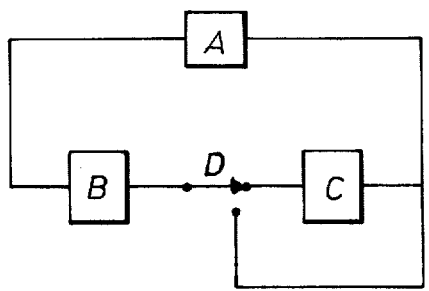

United States Patent [19]
Zirngiebl

[11] 3,890,211
[45] June 17, 1975

[54] PROCESS FOR RECOVERING ENERGY FROM THE DECOMPOSITION OF AMALGAM IN THE ELECTROLYSIS OF ALKALI METAL CHLORIDES

[75] Inventor: Eberhard Zirngiebl, Cologne-Flittard, Germany

[73] Assignee: Bayer Aktiengesellschaft, Leverkusen, Germany

[22] Filed: Apr. 19, 1973

[21] Appl. No.: 352,490

Related U.S. Application Data

[63] Continuation-in-part of Ser. No. 855,772, Sept. 5, 1969, abandoned.

[30] Foreign Application Priority Data
Sept. 21, 1968 Germany............................ 1792588

[52] U.S. Cl. ......... 204/99; 204/DIG. 3; 204/DIG. 4
[51] Int. Cl............................................. C01d 1/08
[58] Field of Search............. 204/DIG. 3, DIG. 4, 99

[56] References Cited
UNITED STATES PATENTS
| | | | |
|---|---|---|---|
| 2,970,095 | 1/1961 | Kandler et al. | 204/DIG. 3 |
| 3,068,157 | 12/1962 | Vielstich et al. | 204/DIG. 3 |
| 3,622,490 | 11/1971 | Lockett | 204/DIG. 4 |

*Primary Examiner*—John H. Mack
*Assistant Examiner*—D. R. Valentine
*Attorney, Agent, or Firm*—Connolly and Hutz

[57] ABSTRACT

A process for the recovery of energy from the decomposition of sodium amalgam in the electrolysis of alkali metal chlorides, wherein the amalgam-forming cell (primary cell) and the amalgam-decomposition cell (secondary cell) are connected in series, so that the voltage of the secondary cell is directed opposite to that of the primary cell and wherein the secondary cell is only connected into the circuit when the sodium concentration in the amalgam is above 0.01 % by weight.

1 Claim, 1 Drawing Figure

PROCESS FOR RECOVERING ENERGY FROM THE DECOMPOSITION OF AMALGAM IN THE ELECTROLYSIS OF ALKALI METAL CHLORIDES

This application is a continuation-in-part application to U.S. Ser. No. 855,772, now abandoned.

The recovery of energy from the decomposition of the sodium amalgam accumulating during the electrolysis of alkali metal chlorides by the amalgam process, including that from the combustion of the hydrogen which is formed during the reaction:

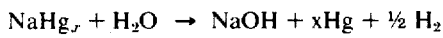
$$NaHg_x + H_2O \rightarrow NaOH + xHg + \tfrac{1}{2} H_2$$

has recently acquired renewed interest following the discovery of the gas electrodes based on activated doubleskeleton catalysts. There are two different basic methods which may be used for the recovery of energy in practice:

1. The sodium amalgam formed in several electrolysis cells is fed to a reactor in which decomposition takes place, accompanied by the recovery of electrical energy. After the reaction, the mercury is redistributed among the cells.
2. The amalgam-forming cells (primary cell) and current-recovering decomposer (secondary cell) are connected in series, so that the voltage of the secondary cell is directed opposite to that of the primary cell. Here, recovery of the electrical energy in the secondary cell has the effect of a reduction in voltage in the primary cell: Chem. Ing. Techn. 34, (1962), No. 5, pp. 349 – 353.

The technically more simple method is the second arrangement — the so-called composite process — because there are none of the problems of amalgam removal, voltage lag and so on, such as occur in the otherwise necessary introduction of the amalgam into a reactor. However, this composite process does have a disadvantage, namely the difference in the anode and cathode yield. If this phenomen is ignored, mercury is soon dissolved since less sodium is supplied in the form of the amalgam than is required for further conducting the current. The anodic sodium yield in the secondary cell is almost 100 % in the form of NaOH, whilst the cathodic sodium yield in the primary cell is only 98 % in the form of sodium amalgam. In order to eliminate these difficulties, there are several possibilities. Some of the current of the primary cell can be guided round the secondary cell with the result that less current is taken from the secondary cell than can be recovered through the amalgam formation. The excess amalgam is then catalytically decomposed.

It is also possible, however, to connect a current in opposition to the secondary cell, i. e., to compensate the Na-balance in the secondary cell by an electrolysis. For a difference in yield of 2 % and a 50,000 amp. load on the primary cell, this would be 1,000 amps. which would have to be connected in opposition in the secondary cell as the sodium amalgam-forming electrolysis current.

Unfortunately, both processes have serious disadvantages. Due to the rigid compensation of the difference in yield, neither of the two systems is able to compensate for fairly strong disturbances. This is particularly evident in the event of short circuits in the anodes, in which case a large proportion of the current flows through the cell without any electrochemical effect through direct contact of anode and cathode material, or in the event of sudden vigorous evolution of hydrogen at the mercury cathode accompanied by the limited formation of sodium amalgam because the current is conducted through another electrochemical reaction. Since disturbances of this nature can occur suddenly and without being noticed, and since the mercury is almost instantaneously dissolved after the sodium has been removed, phenomena such as these can result in considerable losses of mercury, in addition to which the alkali liquor obtained in the secondary cell is made unusable by the mercury content.

In addition, it is necessary to start a cell of this kind with additional efforts to avoid mercury losses since to start with, the secondary cell does not contain any amalgam and accordingly passes through a mercury dissolution stage when the current is switched on. The inflexible procedure of the aforementioned processes has the further disadvantage that the maximum amount of energy that can be recovered is never obtained because, to correct the balance, a little sodium amalgam always has to be catalytically decomposed.

The present invention relates to a process which obviates the disadvantages referred to above and, in addition, is able to react sensitively to any disturbances in the primary cell.

The process according to the invention is characterised in amalgam-forming cell (primary cell) and the current-recovering amalgam-decomposition cell (secondary cell) are connected in series as known per se, except that the secondary cell, controlled through the sodium amalgam concentration, is periodically operated, and the secondary cell is only connected into the circuit when the sodium concentration in the amalgam is above 0.01 % by weight.

Figure 2:
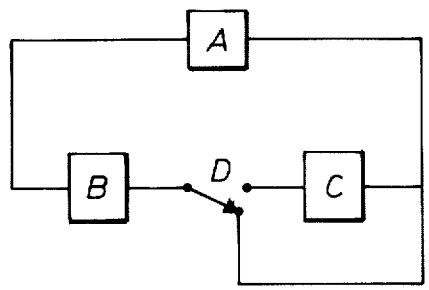

FIGS. 1 and 2 represent schematic diagrams of the two possible arrangements.

A represents therein a direct current source (e. g. 4.5 Volt), B represents the primary and C the secondary cell. D represents a switch. In FIG. 1 the secondary cell is connected into the circuit (sodium concentration above 0.01 % by weight in the amalgam of the secondary cell), in FIG. 2 the secondary cell is not connected into the circuit (sodium concentration below 0.01 % by weight in the amalgam of the secondary cell).

The system may be controlled in such a way that continuous measurement of the amalgam concentration in the secondary cell gives a signal to a control unit when the amalgam content in the cell drops to the limiting value.

The sodium amalgam is not catalytically decomposed. After an empirically determined period in which the amalgam concentration rises back to the required value, the secondary decomposer is connected back into the circuit, for a period controlled by a time switch. Decomposition and regeneration may readily be co-ordinated with one another in order thus to compensate for the difference in yield between the primary cell and the secondary cell.

Switching on and off of the secondary cell may be controlled by two time switches, one of which determines the time interval between two "switch-offs" whilst the other determines the actual switch-off time. The control mechanism itself is only effective in cases where the sodium concentration in the amalgam falls excessively.

Other control mechanisms are of course also possible. Thus, the regeneration phase alone may also be controlled through concentration measurements.

The function of the control system described above in the composite process is described in the following Example:

EXAMPLE a. Control

Whilst the voltage of an amalgam element $$Pt/H_2, NaOH, H_2O/Na, Hg$$

at 60°C, amounts to about 1800 mV. and is hardly effected by the concentration of sodium in the mercury provided more than 0.05 % of Na is still present in the Hg, the voltage of this element soon collapses to lower values when the concentration of the Na in the Hg falls to 0.01 % and less. This sensitive change in voltage may be utilised to generate a signal through an amplifier at any point of the secondary cell when the concentration of the sodium in the amalgam begins to move towards about 0.01 %. A mechanical coupling then breaks the current path through the secondary cell so that the sodium in the amalgam, accommodated in the secondary cell, is not decomposed.

b. Regeneration

The secondary cell of a 10 m² one-way cell (so-called Leverkusener Leistenzelle: J. Billiter, Die technische Elektrolyse, Springer Wien, 1954, page 264, FIG. 101) has a mercury content of about 1000 kg of Hg in the secondary cell. Under a load of 60,000 amps and for a current yield of 98 %, 50.5 kg/h of sodium dissolved in the amalgam are formed in the primary cell. To conduct the current, however, 51.5 kg/hour of sodium are anodically deposited in the secondary cell. If the secondary cell is switched on at a sodium content of 0.2 % Na, the supply of sodium in the secondary cell amounts to about 2 kg, of which 1 kg is decomposed in an hour. If the secondary cell is cut for 1.2 minutes in every hour ("regeneration phase"), this defective balance can be corrected.

If any disturbances occur through the evolution of hydrogen or through contact of the anode with the cathode ("short circuit") in the primary cell, the supply of sodium in the secondary cell is used more quickly. The control unit responds and switches the secondary cell over to regeneration. In the event of serious disturbances in the primary cell, the secondary cell is kept out of operation until the disturbance has been eliminated.

In this way, mercury losses are prevented and the liquor still present in the secondary cell is prevented from being contaminated.

When the plant is in operation, the secondary cell is only switched on when there is enough amalgam in the cell.

I claim:

1. The process for recovering energy from the decomposition of the amalgam which results from the electrolysis of alkali metal chlorides which process includes the steps of decomposing by electrolysis alkali metal chlorides in a primary cell having a mercury cathode which primary cell is amalgam-forming, forming sodium amalgam as a by-product of said electrolysis, decomposing the amalgam in a secondary amalgam-decomposition cell connected in series with the primary cell wherein the improvement comprises a direct current source combined with means for connecting an electrical potential from said direct current source across a primary cell and electrolyzing alkali metal chlorides in the primary cell and means for selectively connecting said electrical potential also across a secondary cell containing sodium amalgam in an amalgam element of $Pt/H_2,NaOH,H_2O/Na,Hg$ so that the current of said direct current source passes through both the primary cell and in series through the secondary cell when the sodium concentration in the amalgam is more than 0.01% by weight thereby decomposing the amalgam in the secondary cell with said current to reduce the sodium concentration, reducing the cell voltage in the secondary cell having said amalgam element by reducing the sodium concentration, correlating said secondary cell voltage to the selective connecting of said electrical potential across said secondary cell and disconnecting the means for connecting said electrical potential across said secondary cell when the sodium concentration in the amalgam is 0.01% by weight or less and thereby continuing electrolysis of alkali metal chlorides in the primary cell and increasing the concentration of sodium in the amalgam element of the secondary cell to more than 0.01% by weight.

* * * * *